United States Patent [19]

Greenaway

[11] 4,122,435
[45] Oct. 24, 1978

[54] APPARATUS AND METHOD FOR PRODUCING AN ELECTRICAL SIGNAL RESPONSIVE TO HANDWRITING CHARACTERISTICS

[75] Inventor: David Leslie Greenaway, Birchwil, Switzerland

[73] Assignee: LGZ Landis & GYR Zug Ag, Zug, Switzerland

[21] Appl. No.: 841,013

[22] Filed: Oct. 11, 1977

Related U.S. Application Data

[63] Continuation of Ser. No. 672,309, Mar. 31, 1976, abandoned.

[30] Foreign Application Priority Data

May 6, 1975 [CH] Switzerland ............ 5790/75

[51] Int. Cl.² ............................................. G06K 9/00
[52] U.S. Cl. ........................................ 340/146.3 SY
[58] Field of Search ............. 340/146.3 SY, 146.3 C, 340/149 A, 149 R; 178/18, 19

[56] References Cited

U.S. PATENT DOCUMENTS

| 3,530,280 | 9/1970 | Goldman | 340/146.3 C |
| 3,673,571 | 6/1972 | Constable | 340/146.3 C |
| 3,955,178 | 5/1976 | Warfel | 340/146.3 SY |

OTHER PUBLICATIONS

Darringer et al., "Speed Pen," IBM Tech. Disclosure Bulletin, vol. 18, No. 7, Dec. 1975, p. 2374-2375.

Primary Examiner—Leo H. Boudreau
Attorney, Agent, or Firm—Burns, Doane, Swecker & Mathis

[57] ABSTRACT

The invention relates to a means and method for producing an electrical signal responsive to identifying characteristics of handwriting. The electrical signal is produced responsive to variations in writing pressure between a writing instrument and a ridged writing surface.

29 Claims, 3 Drawing Figures

APPARATUS AND METHOD FOR PRODUCING AN ELECTRICAL SIGNAL RESPONSIVE TO HANDWRITING CHARACTERISTICS

This is a continuation, of application Ser. No. 672,309, filed Mar. 31, 1976, now abandoned.

BACKGROUND OF THE INVENTION

A hand written signature is often used for the identification of individuals. In most cases, the freshly written signature is used visually for the identification of an individual by comparison with a signature signed elsewhere, e.g. on a credit card, signature card or some other identification paper at a previous time. A forged signature, if done adeptly, may be indistinguishable from a genuine signature by visual comparison. Therefore visual comparison offers a very ineffective deterrent against forgeries.

The use of a writing utensil with a pressure recorder for monitoring the signing of the signature is known in the prior art. This method permits the detection of writing pressure which occurs between the writing utensil and the writing surface as a function of time. The detected pressure may be converted to an electrical signal which is characteristic for a signature and which may be recorded with a recording device. For the identification of an individual this process is repeated and the pressure distibution function so obtained is compared with the formerly recorded pressure distribution function. As a result forgeries are made considerably more difficult because the pressure distribution curve cannot be as easily imitated as the visual aspect of the writing.

It is known in the art to translate handwriting into electrical signals by detecting the position of the writing instrument in two dimensions and producing two electric signals which represent the coordinates of the instantaneous point of contact of the writing instrument on the writing plane. From the two electric signals the vectorial speed and acceleration of the writing stylus are deduced by differentiation and the latter are then converted into digital signals. The speed and the acceleration of the signature represent identification marks which are difficult to imitate. However the cost of the apparatus for employing this technique is very great.

Accordingly, it is a primary object of the present invention to provide an inexpensive means for identifying handwriting.

Another object of the present invention is to provide an apparatus and method for producing an electrical signal in response to writing speed as well as writing pressure.

Still another object of the present invention is to provide an inexpensive means for converting pressure variations between a writing instrument and a writing surface into an electrical signal corresponding to identifying characteristics of the handwriting.

These and other objects and features of the invention will become apparent from the claims and from the following description when read in conjunction with the appended drawings.

THE DRAWINGS

Figure 1:
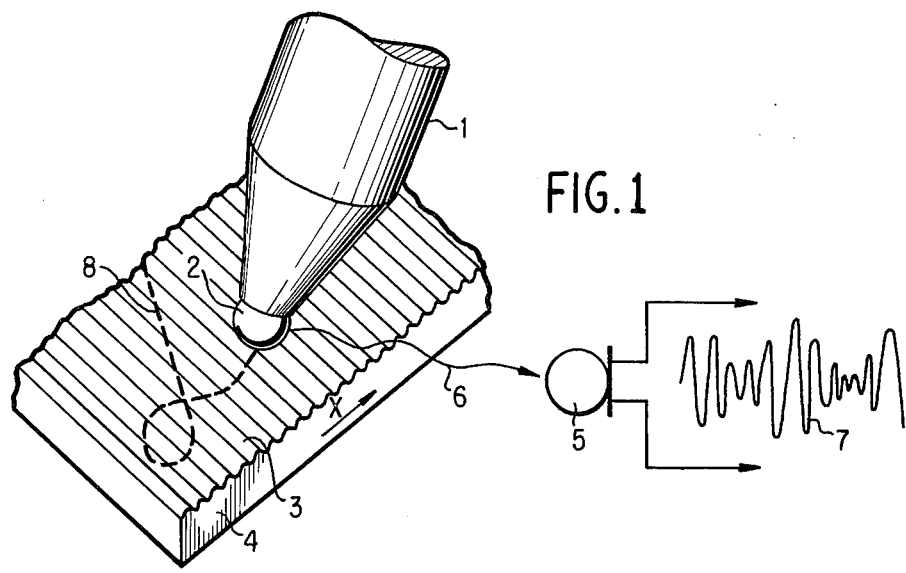
FIG. 1 is a pictorial and schematic view of an embodiment of the present invention.

Referring first to FIG. 1, a writing instrument is designated generally by the numeral "1". A writing tip 2 of the writing instrument may be moved in sliding contact with writing medium 3, typically formed of plastic. The writing medium 3 may have a surface relief varying periodically in the direction of an axis designated "X", which axis is approximately parallel to the principal plane defined generally by the writing medium. The surface relief of the medium 3 may be approximately constant in the direction of an axis perpendicular to the X axis.

As a result of the pressure exerted by the writer on the writing instrument 1, the higher lying areas of the writing medium 3 are deformed elastically. The frequency and amplitude modulated acoustic waves 6 produced thereby may be received by a microphone 5 and are converted into an electric signal 7, the frequency of which depends on the speed of the writing utensil 1 with reference to the structure of the writing medium 3 and the amplitude of which varies corresponding to the pressure exerted on the writing instrument 1. The electric signal 7 has a high informational content corresponding to a signature 8 written with the writing instrument 1 onto the writing surface 3. In order to compare signatures to verify their authenticity, the signal 7 can be analyzed and can be compared with the results of a similar analysis performed on a signal produced in the same manner at a previous time. Since it is extremely difficult to imitate the pressure and speed characteristics of a signature, the method affords a very high degree of protection against forgeries.

In the most simple case, as shown in FIG. 1, the writing medium 3 can be grooved or fluted, i.e., it can show a variable structure in only one axis parallel to the principal plane of the writing medium. It is also possible to provide a relief structure variable periodically in two directions, e.g. a hill-type structure arranged in lines and columns, so that a frequency modulated signal is produced in any given direction of movement of the writing utensil 1.

In the case of a ridged writing surface, the best results will be achieved whenever the writing tip 2 of the writing instrument 1 is spherical and the distance of the ridges of the writing surface is smaller than the radius of the writing body. Preferably the distance of the lines amounts to 2 to 10 μm. The depth of the troughs between the ridges will influence the amplitude of the acoustic signal. It is desirable that the troughs be of sufficient depth and the grooves be of sufficient spacing in order to prevent the writing tip 2 from coming into contact with the bottom of the grooves. The distance of the lines of the grooves and the orientation of the grooves with regard to the general direction of writing represent system constants, which, once they have been chosen, must be kept constant.

Whenever a permanent visible recording of the signature on the writing surface 3 is to be omitted, the writing tip 2 may consist of a mere steel ball, otherwise a customary ball point pen would be suitable as a writing instrument 1.

The production of the electric signal 7 may also be accomplished with a mechanical-electric converter, which may be disposed in the writing instrument 1 and coupled mechanically with the writing tip 2. In this case, the writing tip fulfills a similar function to the stylus of a phonograph transducer, so that transducers customarily used in phonographs, e.g. piezoelectric crystals, can be used to practice the present invention. The electric signal produced in this way may be fed by cable to an instrument for analysis and recording. Finally, it is also possible to employ a writing medium 3 which also functions as the diaphragm of the microphone 5.

Figure 2:
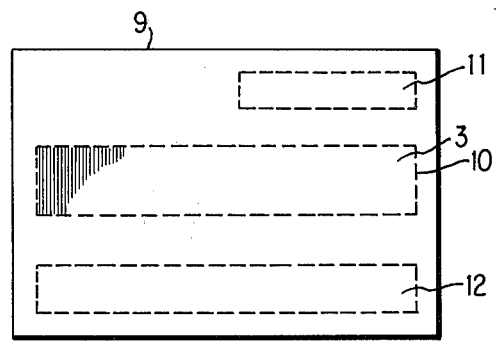
FIG. 2 is a plan view of a card on which a signature may be written in conformity with an embodiment of the present invention.

Referring now to FIG. 2 an identification card, e.g. a credit card, a personal identification card, is denoted generally by the numeral "9". This identity card has an area 10, which may be used as the writing medium 3 for a signature, corresponding to the writing medium of FIG. 1, with a periodically changeable structure. The surface structure of the medium, e.g. a grooving or fluting, may be embossed onto identity card made of plastic and may comprise only the area 10 or any other areas over the entire surface of the identity card. The electric signal 7 (FIG. 1) produced during signing of the identity card 9 may be analyzed and may be converted into a binary or numerical code which can be recorded in the area 11 of the identity card in a visual or machine readable form. In the case of an identity check of an individual presenting the identity card, this code may then be read and compared with the code which is formed in a corresponding manner from the signature of the individual that is to be identified. Unlawful uses of the identity card may be easily and accurately recognized in this manner.

The accuracy of the information recorded on the card may be enhanced if the waveform of the electric signal 7 is recorded on the identity card 9, so that in the case of identification the entire content of information of the signal 7 is available and a comparison e.g. a visual comparison, may be made of the signature waveforms on a screen.

Figure 3:
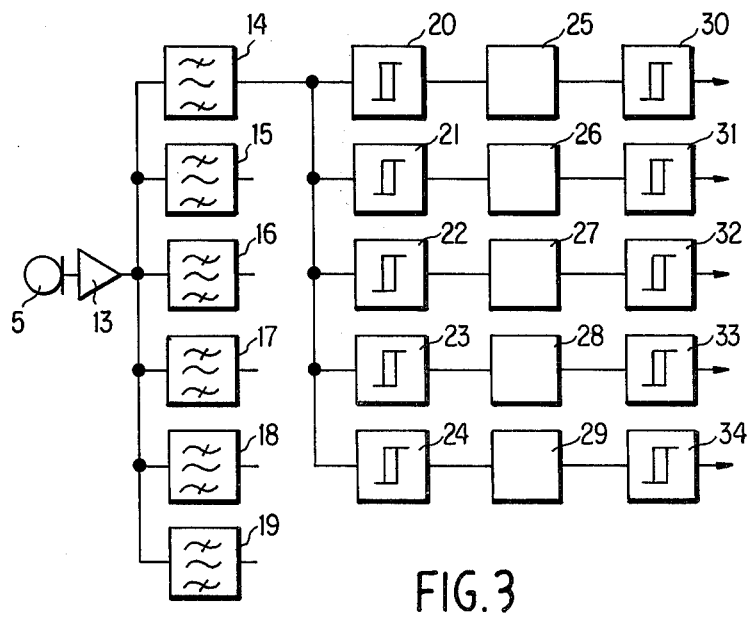
FIG. 3 is a block diagram of an apparatus for analyzing the electrical signal produced by a detector such as that shown in FIG. 1.

In FIG. 3 a block diagram is depicted of an arrangement with which the electric signal 7 can be analyzed. The electric signal produced by the microphone 5 or by a mechanical-electric converter disposed in the writing instrument 1, may be applied by way of an amplifier 13 to several narrow band filters, 14 through 19. Each of these filters may be connected with several threshold switches. For the sake of simplicity, only those threshold switches, 20 to 24, associated with filter 14 are shown in FIG. 3. A time accumulating element, 25 to 29, may be connected to each of the threshold switches. An additional threshold switch, 30 to 34, may be series connected to each of the time accumulating elements.

Each of the filters 14 through 19 may transmit a selected narrow frequency band of the amplified signal. The amplitude modulated signal allowed to pass by each, of the filters 14 through 19 may therefore consist of essentially a single frequency. With the help of the threshold switches 20 to 24 which have variable threshold values mutually graduated, the level of this frequency is analyzed. Every one of the threshold switches may respond for such a length of time as the level of the frequency applied to its input terminal exceeds the threshold value of this threshold switch. The time accumulating elements 25 to 29 accumulate the individual time periods in which the corresponding threshold value is exceeded. The threshold switches 30 to 34 finally may deliver a logic signal 0 or 1 depending on whether the accumulating time sectors reach or do not reach a certain total value.

The time accumulating elements 25 to 29 may comprise RC-elements which, receive a constant voltage when the assigned threshold level signal is imposed on the switch, 20 to 24, to which the element is connected. In another embodiment the elements 25 to 29 may be pulse counters which always count the pulses produced by a common pulse generator whenever the threshold switch 20 to 24 to which the element is connected has been activated. In the last mentioned embodiment, the threshold switches 30 to 34 become superfluous.

The output signals of the threshold switches 30 to 34 of the above mentioned pulse counters represent a binary code characteristic for the signature. Since a complete agreement of the codes of two signatures written at different times cannot be expected, a signature is judged to be genuine whenever its code agrees in a predetermined number of elements with the code serving as a reference.

The principles, preferred embodiments and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. A method comprising the steps of:
writing with a writing instrument on a writing surface having regular generally parallel ridges spaced apart a distance sufficiently small with respect to the tip of the writing instrument so as to prevent contact by the tip of the writing instrument with the bottom of the valleys between the ridges of the writing,
producing a signal related to a characteristic of handwriting responsive to variations in contact pressure between the writing instrument and the writing surface.

2. The method of claim 1, further comprising the steps of converting the signal into a numerical code.

3. The method of claim 2, further comprising the steps of recording the numerical code on an identity card bearing a signature to which the signal corresponds.

4. The method of claim 1, further comprising the step of recording a manifestation of the signal on an identity card bearing a signature to which the signal corresponds.

5. The method of claim 4, wherein the signal is recorded on a magnetic recording carrier of the identity card.

6. The method of claim 1, wherein the generally parallel ridges of the writing surface are spaced apart a distance between about 2 microns and about 10 microns.

7. The method of claim 1, comprising the further step of analyzing the signal with the aid of a plurality of narrow band pass filters.

8. An apparatus for producing an electrical signal responsive to handwriting done with a writing instrument including:
a writing surface with regular generally parallel ridges spaced apart a distance sufficiently small with respect to the tip of the writing instrument so as to prevent contact by the tip of the writing instrument with the bottom of the valleys between the ridges of the writing surface; and, means for producing a signal responsive to the writing by the writing instrument on the writing surface.

9. The apparatus of claim 8 wherein said signal is an electric signal and wherein said means for producing said signal is a microphone.

10. The apparatus of claim 9 where said means for producing said signal is a transducer responsive to variations in pressure between the writing instrument and said writing surface as the writing instrument slidably contacts said writing surface in writing thereon.

11. The apparatus of claim 8 wherein the relief of said writing surface varies in two directions approximately perpendicular to each other and approximately parallel to the principal plane of said writing surface.

12. The apparatus of claim 8, wherein the generally parallel ridges of said writing surface are spaced apart a distance of between about 2 microns and about 10 microns.

13. The apparatus of claim 8, comprising a plurality of narrow band pass filters operatively connected to receive said signal.

14. A method comprising the steps of:
writing with a writing instrument on a body having a surface with a periodically varying relief, the periodicity of the relief being sufficiently small with respect to the tip of the writing instrument so as to prevent contact by the tip of the writing instrument with the bottom of the valleys between the ridges of the writing surface so that the relief structure is elastically deformed by the writing; and,
producing a signal corresponding to a characteristic of handwriting in response to variations in contact pressure between the writing instrument and the writing surface.

15. The method of claim 14, further comprising the step of converting the signal into a numerical code.

16. The method of claim 15, further comprising the step of recording the numerical code on an identity card bearing a signature to which the signal corresponds.

17. The method of claim 16, including the step of analyzing the signal with the aid of a plurality of narrow band pass filters.

18. The method of claim 14, further comprising the step of recording a manifestation of the signal on an identity card bearing a signature to which the signal corresponds.

19. The method of claim 18, wherein the waveform of the electric signal is recorded on a magnetic recording carrier of the identity card.

20. The method of claim 14, including the step of analyzing the signal with the aid of a plurality of narrow band pass filters.

21. An apparatus for producing an electrical signal responsive to handwriting done with a writing instrument including:
a body having a writing surface with a periodically varying relief, the periodicity of the relief being sufficiently small with respect to the thickness of the body so that the relief structure is elastically deformed by the writing; and means for producing a signal corresponding to a characteristic of handwriting in response to variations in contact pressure between the writing instrument and the writing surface.

22. The apparatus of claim 21 wherein said relief varies in a direction approximately parallel to the principal plane of the writing surface.

23. The apparatus of claim 21 wherein the means for producing said signal is a microphone.

24. The apparatus of claim 21 where the means for producing a signal is a transducer responsive to variations in pressure between the writing instrument and said writing surface as the writing instrument slidably contacts said writing surface in writing thereon.

25. The apparatus of claim 21 wherein said relief varies in a direction approximately parallel to the principal plane of the writing surface.

26. The apparatus of claim 21 wherein said relief varies in two directions approximately perpendicular to each other and approximately parallel to the principal plane of said writing surface.

27. The apparatus of claim 21 wherein said relief is in the form of generally parallel ridges, spaced apart a distance between about 2 microns and about 10 microns.

28. A method of producing a signal relating to a characteristic of handwriting comprising the steps of:
(a) providing a writing surface having an elastically deformable, periodically varying relief structure sufficiently small with respect to the tip of the writing instrument so as to prevent contact by the tip of the writing instrument with the bottom of the valleys between the ridges of the writing surface;
(b) writing on the surface with a writing instrument to provide an acoustic signal, the amplitude of which signal varies as a function of the contact pressure between the writing tool and the writing surface, and the frequency of which signal varies as a function of the speed of the writing; and,
(c) converting the acoustic signal to an electrical signal.

29. An apparatus for producing a signal related to a characteristic of handwriting comprising:
a body having a writing surface with a periodically varying relief, the periodicity of said relief is sufficiently small, with respect to the tip of a writing instrument, to produce, in response to the elastic deformation thereof caused by writing on said surface with a writing instrument, an acoustic signal related in frequency to the speed of writing and related in amplitude to the pressure between the writing instrument and said surface; and,
means responsive to said acoustic signal for providing a recordable manifestation thereof as a characteristic of handwriting.

* * * * *